United States Patent

[11] 3,617,145

[72] Inventors Blase G. Celmer;
    Michael J. Rafalski, Jr., both of South Bend, Ind.
[21] Appl. No. 810,660
[22] Filed Mar. 26, 1969
[45] Patented Nov. 2, 1971
[73] Assignee M. B. Skinner Company, Division of Textron Inc.
    Providence, R.I.

[54] COUPON-RETAINING PIPE TAPPING PUNCHES
    10 Claims, 9 Drawing Figs.
[52] U.S. Cl. .................................................. 408/204, 137/318
[51] Int. Cl. ............................................ B23b 41/08
[50] Field of Search ...................................... 77/37–42; 137/318

[56] References Cited
    UNITED STATES PATENTS
    3,411,527  11/1968  Nielsen ........................  77/42 X
    3,295,398  1/1967   Morain ........................  77/42
    3,264,907  8/1966   Mueller et al. ................  77/38

Primary Examiner—Francis S. Husar
Attorney—Merriam, Marshall, Shapiro & Klose

ABSTRACT: A substantially cylindrical or tubular, longitudinally extending, coupon-retaining, pipe-tapping punch having the characteristics described below, and having among other things, a coupon-retaining bore and a tapping portion having tapping edges for forming and enlarging an opening in a metal pipe.

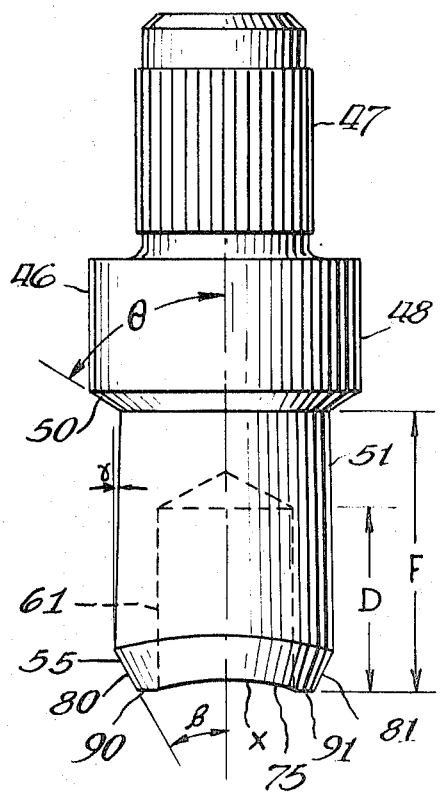
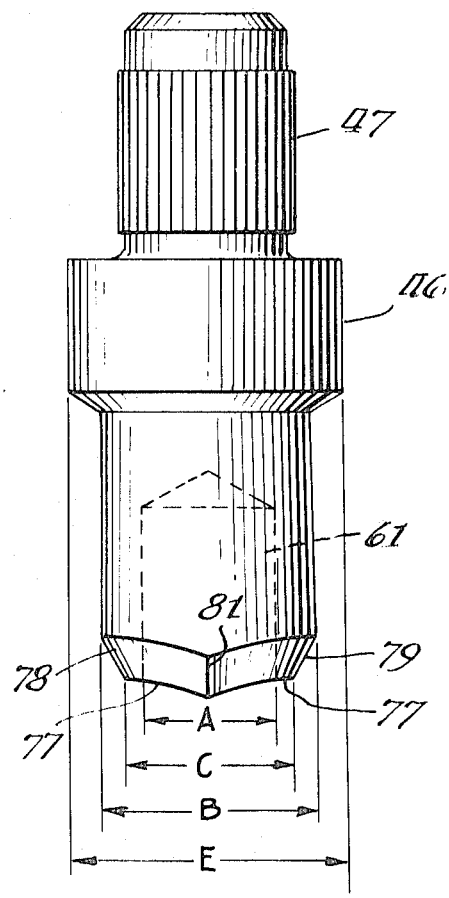
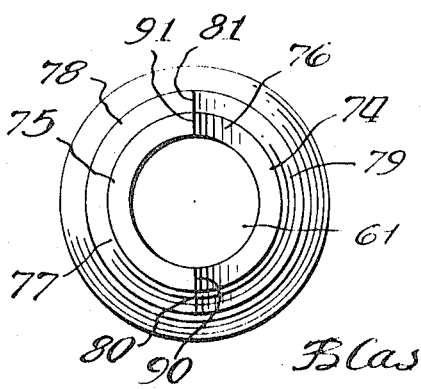

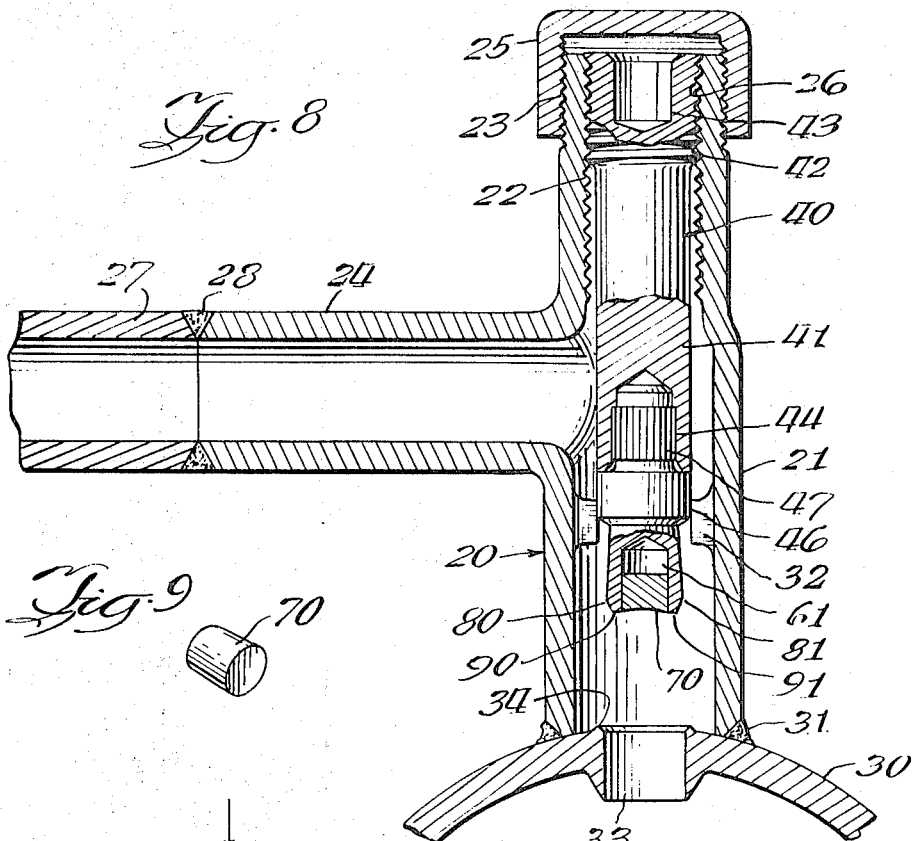

COUPON-RETAINING PIPE TAPPING PUNCHES

This invention relates to coupon-retaining, pipe-tapping punches which consistently retain the coupon tapped from metal pipes for fluids, such as natural gas, water and oil, have the consistent ability not to break during the tapping of metal pipes, are harder than the metal pipes to be tapped, can be used successfully for tapping assorted types or sizes of metal pipes with sufficiently low torque requirements, and can be made commercially at a competitive or reasonably low cost, The term "tapping" as used herein refers to the removing of metal in a pipe to form an unthreaded opening in the pipe wall.

Ever since gas distribution by utilities started, it has been necessary to tap into gas mains to run service connections to industrial establishments and residences.

In the early days, the gas was manufactured and distributed at low pressures, usually less than 1 pound per square inch. Making a tap into a gas main at such a low pressure presented no serious problem. It was not necessary to use elaborate means to contain the gas to prevent its escape during the time needed to make the hole and complete the pipe fitting because the amount of gas escaping was much too small. However, the drilling devices used were big and bulky because relatively large tap holes were needed in such low-pressure lines to permit sufficient flow of gas.

With the advent of natural gas, distribution pressures increased greatly. Generally, the natural gas came from areas far removed from the consuming areas and, therefore, ti was necessary to transmit the gas at high pressures through cross-country transmission lines. Since the gas arrived at high pressures of, for example, 100 to 300 pounds per square inch, the distribution companies utilized the gas at these pressures or partially reduced pressures that were much higher than the low pressures historically used in distributing manufactured gas to the branch line.

To make a tap or service connection into a high pressure gas line requires that the gas be controlled or contained during the tapping operation. Besides the danger involved in escaping gas at high pressure, the loss retained within released gas would be high. It is not feasible to shut off the gas line during the tap because gas supplied to consumers would be interrupted. Therefore, the tap must be made at high pressures while the gas flow continues uninterrupted.

Prior to the present inventions, methods had been developed to a fair degree of suitability, but not without problems for tapping the high-pressure steel gas distribution lines. Usually a T-fitting was employed by either welding or clamping it to the distribution line, and an expensive and bulky drill device having a drill with a T-fitting was connected to the fitting and was used to make the hole in the pipe wall. A stuffing box or valve arrangement was provided to contain the gas after the hole was made and the drill was removed. Such drilling devices were expensive and were costly to maintain. They required servicing, maintenance and replacement of parts. They were also relatively tedious to set up and use in the field, and their use required continuous manipulations with both hands of the user. The chips and cuttings necessarily formed by the drill in making the hole entered the pipeline and their presence posed a potential problem in clogging or plugging various openings needed for uninterrupted transmission of gas, and interferred with the operation of regulating devices and valves. These problems existed since at least 1929. The need for a more practical, inexpensive, safe device for making service taps thus existed for many years.

Although more recently other less expensive, less bulky, and readily operated metal, pipe tapping tools, such as the tapping punch disclosed in U.S. Pat. No. 2,990,731, became available and did not permit chips to enter into the pipe main, these devices, in the course of their tapping operation, deposited a coupon in the pipe main so that an undesirable foreign body entered into the pipe, The use of such tapping punches involved the cold flow of the metal of the pipe as the punch was advanced axially into the pipe and may be properly called "swagging," although the term "swedging" also has been used to describe this metal-forming operation.

Various efforts have been made heretofore to provide pipe-tapping punches for metal pipes which will not only form a coupon during the perforation or swagging of the pipe, but will also consistently retain the coupon tapped or swagged out of the pipe. Unfortunately, many such devices have not been completely satisfactory in their operation because of their inability to provide assured retention and withdrawal of the coupon from the pipe, their tendency to break during certain tapping operations, manufacturing problems (e.g., heat-treating problems, problems of desired economical manufacture in accordance with specifications, etc.), as well as the undesirably large torque application required to perform the desired tapping or swagging operations.

Recently, the use of a double step tapping punch such as broadly shown in U.S. Pat. No. 3,411,527 has been employed for tapping metal pipes. While this punch, if properly heat treated and made of the proper metal of the proper hardness and having proper dimensions has been satisfactory as compared to other prior art punches, it has several inherent deficiencies. One of these deficiencies arises with respect to the coupon which is formed in the course of tapping a metal pipe with the double step punch.

When the tip of the double step punch is axially advanced into the wall of a pipe, the metal from the pipe is caused to enter a bore located at the tapping end of the punch tip and ultimately a mushroom-shaped coupon having a cylindrical stem with an enlarged cylindrical head is formed. The head of the coupon is of a cross-sectional size that is larger than the opening made in the pipe by the primary or initial tapping portion at the free end or tip of the double step, but generally is smaller in radial cross section than the opening made with the secondary tapping portion or shoulder of the double step punch. However in some cases where, because of manufacturing problems, the punch tip is positioned off center from the radial axis of a pipe to be tapped, the head of the coupon formed contacts the sides of the pipe opening upon withdrawal of the punch tip following a tapping operation. As a result, the coupon, upon withdrawal of the punch by the operator from the swagged opening is pulled out of the bore in the punch tip and drops into the pipe.

In other instances, the cylindrical head of the coupon is formed such that its radial cross section is larger than the size of the opening made in the pipe by the second tapping portion of the double step punch so that upon withdrawal of the punch tool following a tapping operation, the coupon hits the pipe and is dislodged from the punch tip.

A further problem encountered with the double step punch arises due to the axial spacing between primary and secondary tapping portions. In designing the double step punch it is necessary to hold the axial space between the primary and secondary portions to a critical dimension in order that the initial or primary tapping portion does not go completely through the wall of the pipe before the secondary tapping portion or shoulder commences its enlarging operation. The need to assure the entry of both tapping portions into the pipe wall before the primary tapping portion completes its entry through the pipe wall arises due to the inability of an operator to properly use a double step punch.

In tapping a pipe with a coupon-retaining punch, an operator, as he rotates the punch axially into the pipe, will initially observe a high torque; however, as the punch is advanced further into the pipe, the torque decreases. The operator will continue to advance the punch into the pipe until he again observes or senses a significant increase in torque. The obtaining of the increased torque generally is the signal to the operator that an opening has been made in the pipe wall and the punch had been advanced to the shutoff portion of the punch. The operator then withdraws the punch tip, along with the coupon lodged in the bore of the tip, from the wall, thereby completing the punching operation. With the double step punch it was found that if the second tapping portion was axially spaced too far from the primary tapping portion, i.e., a distance greater than the thickness of the pipe wall, an operator, in tapping with the double step punch, would achieve a certain torque in the primary tapping stage of the operation and could mistakingly assume the torque increase, when the secondary tapping portion was reached, as indicating that the shutoff portion of the punch was seated against the pipe wall. As a result, the operator would commence withdrawing the punch tip, without having performed or completed the second or enlarging tapping step, whereby the mushroom-shaped coupon would hit the small opening in the pipe wall, be pulled from the bore of the punch tip, and fall into the pipe.

Consequently, in manufacturing double step punches, it is important to make certain that the secondary tapping portion is sufficiently close to the primary tapping portion for the purpose of preventing such a significant increase in torque that an operator would fail to complete an entire tapping operation. By placing the secondary tapping portion or shoulder sufficiently close to the primary tapping portion so that tapping with the secondary tapping portion commenced before the primary portion passed entirely through the wall, it was found that the change in torque increase, did not change significantly.

The longitudinally extending, metal, coupon retaining, pipe-tapping punches of our present invention minimize various deficiencies inherent with other metal pipe-tapping tools, including those associated with the double step punch. Our pipe-tapping punches are effective in readily forming a coupon in a pipe. Additionally, in about 100 tapping tests with our new and improved punch, the coupon retention was 100 percent, thus assuring a secure retention of the coupon in the punch as the punch is withdrawn from the opening formed by the punch in the tapped metal pipe.

Our metal tapping punches, which tap openings of assorted cross-sectional sizes (e.g., ¼-inch, ⅜-inch, ½-inch diameter openings) are harder than the metal pipe which is tapped have the consistent ability to be used in tapping metal pipes without breaking, can be used successfully for tapping assorted types or sized of metal pipes such as mains or the like with excellent low torque requirements. Moreover, our new and improved punch can be made commercially at a competitive or low cost as compared to competitive prior art devices including the double step punch.

Our pipe-tapping punches work satisfactorily with difficult to tap steel gas mains such as 4-inch Milwaukee pipe having a wall thickness of approximately one-fourth inch and to which a tapping T-fitting has been secured to the pipe by means of acetylene welding.

Briefly, the cylindrical or tabular, longitudinally extending coupon-retaining pipe-tapping punches of our invention include, among other things, a longitudinally extending coupon (sometimes referred to as a "slug")—receiving bore and swaging edges located at the open tapping end of the tool. The punch taps into the pipe and immediately commences swaging and enlarging the opening as the tool is advanced into the pipe. Rearward of this portion is reduced shank portion which has a back taper extending to a shutoff shoulder portion of the punch tool.

In a punching operation with our new and improved punch, a coupon is formed; however, unlike the mushroom-shaped coupon formed with other prior art punch tools, the coupon formed with our new and unobvious punch does not have a mushroom shape, but rather the coupon is protectively shielded by being contained substantially in the bore of the tool. The coupon formed with our new punch has a cylindrical shape which would correspond to the stem of the mushroom-shaped coupons formed with prior art devices, including the double step punch.

It is believed the coupon is retained in the bore of our new punch primarily due to friction between the bore wall and the wall of the coupon as opposed to having a permanent deformation of the metal-tapping portion to provide a positive mechanical interlock with the coupon as set forth, for example, in U.S. Pat. No. Re. 26,224. With the metal-tapping punch of the present invention, the coupon, following a tapping operation, can be readily removed by hand from the bore and the punch can be reused, if desired, in another tapping operation.

A tapered, frustoconical, shutoff shoulder portion is positioned rearward of the reduced shank portion. When the punch is axially advanced toward and into the pipe sufficiently, the shutoff shoulder portion becomes seated against the upper or outer peripheral portion of the opening made in the pipe wall. Thus, the shutoff portion provides a valve which seals the opening made in the pipe and thereby prevents the escape of fluid, such as oil or natural gas from the pipe.

The type of metal and the hardness of the metal used to form the tapping portions of the punch and certain dimensional sizes and shapes of the punch have been found to be important in contributing to the performance characteristics sought and satisfied by our punch. These are discussed or set forth in added detail below.

Other features and advantages are inherent in the subject matter disclosed and claimed herein, as will become apparent to those skilled in the art from the following detailed description, including the accompanying illustrative drawings, wherein:

FIG. 1 is an enlarged vertical side view of a pipe-tapping punch or tool of the present invention;

FIG. 2 is an enlarged vertical side view of the pipe-tapping punch of FIG. 1 as viewed at a position 90° to the view of FIG. 1;

FIG. 3 is an enlarged bottom view of the tip of the pipe-tapping punch shown in FIG. 1 with the coupon removed;

FIG. 4 is a fragmentary vertical sectional view of the pipe-tapping punch shown in FIG. 1 as it is axially advanced to a position on top of the wall of the metal pipe to be tapped;

FIG. 5 is a fragmentary vertical sectional view of the pipe-tappng punch shown in FIG. 1 as it advances axially into the wall of the metal pipe and commences forming a coupon as the tapping portion enters into the wall;

FIG. 6 is a fragmentary vertical sectional view of the pipe-tapping punch shown in FIG. 1 as it completes the forming of the opening in the wall of the metal pipe and the back or reversed tapered portion of the intermediate shank portion passes through the sides of the opening formed in the pipe;

FIG. 7 is a fragmentary vertical sectional view of the pipe-tapping punch shown in FIG. 1 as it reaches the tapered, shutoff shoulder portion of the punch which is sealably seated in and against the upper peripheral portion of the opening formed in the metal pipe;

FIG. 8 is a vertical, front, partial, sectional view illustrating the coupon-retaining pipe tapping punch of the present invention and retained coupon, mounted in a T-fitting having a longitudinally extending tubular portion secured to the tapped metal pipe and laterally extending tubular portion which is connected to a branch line (shown in part); and FIG. 9 is a perspective view of the coupon or slug which is retained in the pipe-tapping punch of FIG. 8 upon withdrawal of the punch from the pipe following a pipe-tapping operation.

Referring now to the drawings wherein like reference characters denote corresponding parts, and first more particularly to FIG. 8, that figure shows a tubular T-fitting 20 with a tubular or cylindrical, longitudinally extending, coupon-retaining, pipe-tapping punch 40 which is threadably mounted therein. The T-fitting 20 has a longitudinally extending tubular portion 21 adapted to be secured in a suitable manner to a pipe at its lower or inner end, and internal screw threads 22 and external screw threads 23 at its other, upper or outer end. The lower end of the T-fitting 20 is shown secured and sealed to the metal pipe 30 containing fluid, such as natural gas, water or oil, under pressure by a welded point 31. If desired, the T-fitting can be secured to the pipe by means of a saddle connection (now shown), or other suitable means. A laterally extending tubular portion 24 projects from the longitudinally extending portion 21 intermediate its ends, and is adapted to be connected and sealed to a branch line 27 by a welded joint 28 or other suitable means.

A removable cap 25 with internal screw threads 26 is shown threadably secured to the external screw threads 23 of the T-fitting FIG. 8 show a metal coupon 70 (see FIG. 9), formed by the pipe-tapping punch 40 from the pipe 30, retained in the axially concentric, cylindrical punch bore 61 (see FIG. 3) at the lower or inner tip or tapping end of the punch after the retained coupon 70 has been removed by and retracted with the punch 40 from the pipe 30 through an enlarged opening 33 formed in the pipe by the punch.

The substantially cylindrical, longitudinally extending, coupon-retaining, pipe-tapping punch 40 comprises two steel parts, namely, an upper or outer substantially cylindrical body or base portion 41 secured to a lower, substantially cylindrical, combined shutoff and tapping tool 46. The upper or outer portion of the body portion 41 has external screw threads 42 which threadably engage the internal screw threads 22 of the T-fitting 20, and an internal, noncircular socket, such as a hexagonal socket 43, for receiving a wrench or tool (not shown) which can be inserted therein to rotate the entire punch 40 and thereby provide for its axial, longitudinal advancement and retraction in the T-fitting 20. Punch 40 is guided in its longitudinal advancement by means of guide ribs 32 located on the inside wall of T-fitting 20.

The lower or inner end of the body portion 41 has a cylindrical tool-receiving socket 44 which receives the externally splined or knurled cylindrical neck portion 47 of the tool 46 which is positioned at the upper or outer end of the tool. The neck portion 47 is somewhat larger in diameter than the socket 44. It is desirable to have the neck portion 47 positioned within the entire length of the socket 44. The two parts are shown in FIG. 8 firmly press-fitted and locked together. The socket 44 and neck portion 47 provide an integral assembly and prevent the two parts from rotating with respect to each other during rotation and axial movement and operation of the tapping punch.

Other means may be used to secure these parts to each other and, if desired, the punch 40 may be formed of a single part rather than having multiple parts secured to each other.

The tool 46 is harder than the metal pipe or structure to be tapped, has a Rockwell "C" hardness of about 54–58, and is constructed of shock-resisting tool steel having an A.I.S.I. designation of S2, such as sold by Carpenter Steel Co. as "-Solar" steel.

Referring now more particularly to FIGS. 1–3, the tool 46 comprises a cylindrical neck portion 47, a large cylindrical shank portion 48, reduced shank portion 51, and a reduced, tapered tapping portion 55.

Shank portions 48, 51 are connected to each other by tapered shoulder portion 50. More specifically, the large shank portion 48 is connected to the reduced shank portion 51 by a frustoconical shutoff shoulder portion 50 which is adapted to be sealably seated against the upper or outer, peripheral, frustoconical lip portion 34 of the enlarged opening 33 which is formed in the metal pipe 30 by the tool 46 during the tapping of the pipe 30 and advancement of the shutoff shoulder portion (see FIG. 7). The reduced shank portion 51 has a back or reverse taper (about 1°–6° and preferably about 2° with respect to the longitudinal axis) which advances inwardly moving back from tapping portion 55 to shutoff shoulder portion 50.

Tapping portion 55 has at its free tapping end, a pair of frustoconical tapered or beveled outer surfaces 78, 79 whose axes are substantially parallel to the axis of the tool 46. The leading edge 77 defined at the junction of the tapered outer surfaces 78, 79 with the annular-shaed surface 76 is curved. Also as a result of the shape of outer surfaces 78, 79 the beveled end of tapping portion 55 has opposed tapered apices or edges 80, 81 converging towards its open or free end.

The angle of taper or bevel of surfaces 78, 79 relative to the axis of the tool may be from 15° to approximately 40°. It is preferred that angle B be 30° to the axis of the tool.

An annular-shaped surface 76 is formed about the axially concentric, coupon-retaining bore 61. This narrow annular configuration which is positioned between the concentric bore 61 and the outer tapping surface composed of tapered surfaces 78, 79, serves to concentrate the pressure exerted by axial advancement of the tool into the pipe 30. Surface 76 and apices or edges 90, 91 located on that surface are generated by a line which is initially rotated in an arcuate and substantially horizontal manner for 180° about the longitudinal axis of tool 46 and then rotated in a corresponding arcuate and substantially horizontal manner for the remaining 180°. This movement of the line results in the intersection of the crescent-shaped surfaces 74, 75 of annular-shaped surface 76 thereby providing swaging apices or edges 90, 91. FIG. 1 shows the edges 90, 91 lying in a plane which is perpendicular to the longitudinal axis of tool 46. While it is desirable to have these edges positioned in this manner, it is possible to have edges 90, 91 tapered inwardly or outwardly a slight amount.

Edges 90, 91 extend along the radial axis of the tool 46 with edge 91 intersecting swaging edge 81 and edge 90 intersecting swaging edge 80 as seen in FIG. 3. The edges are preferably arranged in this manner so that in a tapping operation, swaging edges 80, 81 commence swaging the material at the same time as swaging edges 90, 91 deform the meterial.

It is important that the bore dimension and the angle of taper B be controlled dimensionally in order that the annular-shaped surface 76 is not eliminated as this would also eliminate edges 90, 91. If these dimensions are not controlled and swaging edges 90, 91 are eliminated, the open or free end of the tapping portion 55 becomes, what is known as, a "-feather edge" and in operation of the tool 46, the tapping portion 55 will tend to break because of the inability of the feather edge to hold up when pressure is exerted on the tool. Further, it has been found that it is extremely difficult to obtain proper, consistent, and economical heat treatment of a production punch having a tapping portion with a feather edge.

It has been found that if the thickness of annular shaped surface 76 is reduced to significantly, for example, by increasing bore diameter 61, a coupon, formed in a tapping operation with a punch having the increased bore diameter, will drop out of the punch. Additionally, if the width of the annular surface 76 slightly in reduced, the open end of the punch will collapse slightly in a tapping operation. This collapse of a punch was observed both by visual observation of a punch after a tapping operation as well as observing an excessive amount of torque upon initial tapping of the pipe, with a punch having a reduced width of the annular-shaped surface.

Similarly, it was found that if a portion of radial edges 90, 91 were tapered to provide a taper between edges 90, 91 and corresponding edges 80, 81 a coupon formed with this modified punch was not retained within the punch following a tapping operation.

The results of these tests in which either the diameter of bore 61 was increased or a taper was placed on the outer periphery of the annular surface of a punch, indicate that reducing the width of surface 76 adversely affects the coupon retention capabilities of a punch as well as, in some cases, causing undesired torque levels and collapse of the open end of the tapping portion.

The longitudinally extending bore 61 is at least as long, preferably somewhat longer, than the wall thickness of the metal pipe 30.

When the tool 46 of the punch 40 is axially advanced into the wall of the pipe 30, the metal from the pipe is caused to enter the bore 61 and ultimately form a coupon 70 (see FIG. 9) which is generally cylindrical in shape and has a diameter about the size of the diameter of bore 61. The cylindrical shape of coupon 70 enables it to be readily withdrawn from the pipe 30 and retracted with tool 46 without being dislodged by contacting the walls of the enlarged opening 33.

Referring to the reference characters in FIGS. 1 and 2, which concern dimensions, including angles, Table A below shows illustrative dimensions (see corresponding reference characters in FIGS. 1 and 2) for three illustrative sizes of coupon-retaining, pipe-tapping punches (i.e., ¼-inch, ⅜-inch and ½-inch punches) made in accordance with our invention and having sufficiently low torque characteristics.

TABLE "A".—ILLUSTRATIVE TAPPING PUNCHES OF FIGS. 1 AND 2

| | Sizes of punches, inches | | |
|---|---|---|---|
| | ¼ | ⅜ | ½ |
| Tapping portion—55: | | | |
| A—Diameter of bore 61, inches. | 0.125 | 0.201 | 0.312 |
| B—Outer diameter, inches | ¼ | ⅜ | ½ |
| C—Inner diameter, inches | .175/.170 | .290/.285 | .405/.400 |
| D—Length of bore 61, inches | $7/16$ | $7/16$ | $7/16$ |
| β—Taper, degrees | 30 | 30 | 30 |
| X—Radius, inches | ¼ | ⅜ | ½ |
| 51 Reduced shank portion: | | | |
| α—Taper, degrees | 2 | 2 | 2 |
| 50 Shut-off shoulder portion: | | | |
| E—Stock diameter, inches | $7/16$ | ½ | ⅝ |
| F—Distance from tip, inches | $19/32$ | $19/32$ | $21/32$ |
| φ—Taper, degrees | 60 | 60 | 60 |
| Major diameter of tapped hole 33, inches | ¼ | ⅜ | ½ |

Table B shows illustrative ranges (must be controlled and coordinated to give results sought) of dimensions (see corresponding reference characters in FIGS. 1 and 2) for the same three illustrative sizes of coupon-retaining, pipe-tapping punches shown in table A.

TABLE "B".—ILLUSTRATIVE TAPPING PUNCHES OF FIGS. 1 AND 2

| | Illustrative ranges of dimensions for punches (¼", ⅜", ½") |
|---|---|
| Tapping portion—55: | |
| A—Diameter of bore 61, inches | $3/32$–$11/32$. |
| B—Outer diameter, inches | 0.180–0.500. |
| C—Inner diameter | (See Table A.) |
| D—Length of bore 61, inches | At least $5/16$. |
| β—Taper, degrees | 15–40. |
| 51 Reduced shank portion: α—Taper, degrees | 1–6. |
| 50 Shut-off shoulder portion: | |
| E—Stock diameter, inches | About ¼–⅝. |
| F—Distance from tip, inches | At least $17/32$. |
| φ—Taper, degrees | 25–65. |

Prior to the tapping operation, a thick noncorrosive grease or lubricant should be applied to the swaging portions of the tool. A dry form of lubricant may be used and applied either by dipping or spraying and should be concentrated at the tapping portion, including the swaging or tapping edges of the tapping portion. One lubricant which has been found suitable constitutes molybdenum disulfide suspended in volatile material. Other lubricants which are suitable include a carrier of the synthetic resin type which may have suspended therein minute particles or flakes of copper, lead or indium. In operation (see FIGS. 4–7), the cylindrical, longitudinally extending, coupon-retaining, pipe-tapping punch 40 is advanced axially downwardly toward the metal pipe 30 by inserting a wrench or similar tool into the socket 43 and rotating the wrench and punch. When the taping top of the tool 46 is advanced into the wall of the pipe 30, swaging edges 90, 91 of the tool 46 cause metal from the pipe to flow into the punch bore 61 and commence the formation of coupon 70. At the same time as edges 90, 91 engage the pipe, swaging edges 80, 81 also engage the pipe wall. As the axial advancement of the tool is continued tapered swaging edges 80, 81 enlarge the opening to a cross-sectional size that is larger than coupon 70.

As the tool 46 continues to advance, it will cause the frustoconical shutoff shoulder portion 50 to become sealably seated in the frustoconical lip or valve seat 34 (see FIG. 7) formed at the outer or upper periphery of the enlarged opening 33.

When the punch 40 with the retained coupon 70 is rotated in a reverse direction by the wrench or tool, the punch is axially retracted and the tool 46 with the securely retained coupon 70 is removed from the pipe 30 through the enlarged opening 33 without being dislodged by interference by or contact with the enlarged opening. As clearly seen in the drawings the enlarged opening 33 is larger than coupon 70 and the securement (apparently at least in part due to the frictional contact of coupon and tool) of the coupon 70 in the punch bore 61, is such that the coupon is protectively surrounded by the wall of the bore 61 of tool 46 which assures the ready and consistent withdrawal of the coupon from the pipe.

After the withdrawal of the punch 40 and retained coupon 70 from the pipe 30, the fluid within he pipe is free to flow out of the enlarged opening 33 and into the laterally extending tubular portion 24 and into the connected branch line 27 as shown in FIG. 8. The threaded cap 25 may then be screwed onto the external threads 42 at the upper or outer end of the T-fitting 20 in the manner shown in FIG. 8.

FIGS. 4–8 sequentially show various progressive stages of the above-described axial advancement of the tool 46 which provides the tapping and shutoff operations, and axial withdrawal of the tool 46 from the pipe 30. More particularly, swaging 5 shows a stage in the forming cross-sectional the coupon 70 by the swaging edges 80, 81, 90, and 91.

FIG. 6 shows the forming of the opening 33, the coupon 70 and an early stage of separation or freeing of the coupon from the pipe 30 at the same time the opening is being enlarged by swaging edges 80, 81. Opening 33 has a cross!-sectional size that exceeds that of coupon 70 as seen in FIGS. 6 and 7. FIG. 7 shows the frustoconical shutoff shoulder portion 50 in an advanced position where it is sealably seated in and acting as a valve with the frustoconical lip 34 following the tapping operations and advancement of the shutoff shoulder portion. The retained coupon 70 is shown advanced within the pipe 30.

FIG. 8 shows the tip of the tool 46 and retained coupon 70 withdrawn from the pipe 30. Axial retraction of the punch 40 with the retained coupon 70 can be continued as is evident from the same figure.

The foregoing detailed description has been given for clearness of understanding only, and no unnecessary limitations should be understood therefrom, as some modifications will be obvious to those skilled in the art.

We claim:

1. A substantially cylindrical, longitudinally extending, coupon-retaining, metal-tapping punch having an elongated tool which is constructed of steel which is harder than a member to be tapped, has sufficiently low torque requirements, consistently retains a coupon, and does not break during the tapping of the metal member;

said tool having a tapping portion having an outer tapping surface, and a bore at the free-tapping end of said tapping portion for retaining a coupon formed from the metal member during tapping by the tool;

an annular tapping surface on said free-tapping end of said tapping portion, said annular surface being positioned between said bore and said outer surface;

said tapping portion including at least one substantially radial tapping edge extending along and projecting outwardly from said annular surface;

at least one second tapered tapping edge extending along and projecting outwardly from said outer tapping surface;

said second tapping edge comprising an apex formed by intersecting surfaces; and, said first and second tapping edges intersecting at the outer marginal edge of said annular surface, whereby in a tapping operation said first and second tapping edges will simultaneously commence tapping material from the member to be tapped.

2. A substantially, cylindrical, longitudinally extending, coupon-retaining, metal-tapping punch having an elongated tool which is constructed of steel which is harder than a member to be tapped, has sufficiently low torque requirements, consistently retains a coupon, and does not break during the tapping of the metal member;

said tool having a tapping portion having an outer tapping surface, and a bore at the free-tapping end of said tapping portion for retaining a coupon formed from the metal member during tapping by the tool;

an annular tapping surface on said free-tapping end of said tapping portion said annular surface being positioned between said bore and said outer surface;

said tapping portion including a plurality of substantially radial tapping edges, each of said edges extending along and projecting outwardly from said annular surface, a plurality of second tapered tapping edges, each of said edges extending along and projecting outwardly from said outer tapping surface;

each of said second tapping edges comprising an apex formed by intersecting surfaces; and, each of said radial edges intersecting with a corresponding second tapping edge at the outer marginal edge of said annular surface, whereby in a tapping operation said first and second tapping edges will simultaneously commence tapping material from the member to be tapped.

3. The coupon retaining punch of claim 2, wherein said outer surface tapping edges are tapered rearwardly and outwardly from said annular surface of said tool at an angle of about 30° with the longitudinal axis.

4. The coupon retaining punch of claim 2, wherein said taper of said outer surface tapping edges are in the range of about 15°–40°.

5. A coupon retaining punch according to claim 2 wherein said radial tapping edges are equally spaced from each other.

6. A coupon retaining punch according to claim 2 wherein said punch is made of a tool steel having a Rockwell "C" hardness of about 54 to about 58.

7. Coupon-retaining, pipe-tapping assembly means for tapping an opening into a metal walled pipe for fluids comprising:

a T-fitting adapted to be secured to a metal walled, fluid-containing pipe to be tapped and to a branch line;

said T-fitting having a longitudinally extending tubular portion adapted to be secured to the pipe at its inner end, internal screw threads at or near its other, outer end, and a laterally extending tubular portion intermediate said ends of said longitudinally extending tubular portion and being adapted to be connected to a branch line;

a substantially cylindrical, longitudinally extending, coupon-retaining, metal-tapping punch having an elongated tool portion which is constructed of steel which is harder than the pipe to be tapped, has low torque requirements, consistently retains a coupon, and does not break during the tapping of the pipe;

said tool having two ends with a tapping portion at one end and external screw threads at or near the other of said ends said threads being adapted to threadably engage said internal screw threads of the T-fitting and to permit, upon rotation, axial advancement of said tool toward said pipe to be tapped and axial retraction therefrom upon reverse rotation;

said tool having a tapping portion having an outer tapping surface, and a bore at the free-tapping end of said tapping portion for retaining a coupon formed from the metal member during tapping by the tool;

an annular tapping surface on said open end of said tapping portion, said annular surface positioned between said bore and said outer surface and having a substantially uniform width about said entire annular surface;

said tapping portion including at least one tapping edge located at said annular surface;

at least one tapping edge extending and tapering longitudinally outwardly away from said annular surface and along said outer surface of said tapping portion; and said annular surface being of sufficient width to provide for retention of a coupon in said bore in a tapping operation in which the coupon formed by the metal in said metal member is cylindrically shaped and is disposed substantially entirely within said bore and said coupon is protectively shielded by the wall of said bore, does not have a head portion extending throughout the width of said annular surface, and is free of contacting the wall of the opening made in said metal member by said tapping portion.

8. The coupon retaining punch of claim 2 wherein said radial edges comprise two opposed edges and said second tapping edges comprise two opposed edges 9. Coupon-retaining pipe-tapping assembly means for tapping an opening into a metal-walled pipe for fluids comprising:

a T-fitting adapted to be secured to a metal walled, fluid-containing pipe to be tapped and to a branch line;

said T-fitting having a longitudinally extending tubular portion adapted to be secured to the pipe at its inner end, internal screw threads at or near its other, outer end, and a laterally extending tubular portion intermediate said ends of said longitudinally extending tubular portion and being adapted to be connected to a branch line;

a substantially cylindrical, longitudinally extending, coupon-retaining, metal-tapping punch having an elongated tool which is constructed of steel which is harder than a member to be tapped, has sufficiently low torque requirements, consistently retains a coupon, and does not break during the tapping of the metal member;

said tool having a tapping portion having an outer tapping surface, and a bore at the free tapping end of said tapping portion for retaining a coupon formed from the metal member during tapping by the tool;

an annular tapping surface on said free tapping end of said tapping portion, said annular surface being positioned between said bore and said outer surface;

said tapping portion including a plurality of substantially radial tapping edges, each of said edges extending along and projecting outwardly from said annular surface;

a plurality of second tapered tapping edges, each of said edges extending along and projecting outwardly from said outer tapping surface;

each of said second tapping edges comprising an apex formed by intersecting surfaces; and, each of said radial edges intersecting with a corresponding second tapping edge at the outer marginal edge of said annular surface, whereby in a tapping operation said first and second tapping edges will simultaneously commence tapping material from the member to be tapped.

10. The method of tapping an opening in a metal pipe in which a coupon is formed as the opening is made in the pipe and removed from the pipe, said method comprising the steps of:

positioning a substantially, tubular, longitudinally extending, metal-tapping punch having a tapping portion with an axial bore at the free tapping end of said tapping portion, so that said punch extends substantially normal to the axis of a metal pipe and threadably engages with means for facilitating axially moving the punch into and out of contact with the pipe by rotation of the punch;

said tapping portion having an outer tapping surface, and an annular surface on said free tapping end, said annular surface being positioned between said outer surface and said bore;

a plurality of radial-tapping edges located at said annular surface and a plurality of tapping edges extending and tapering longitudinally outwardly away from said annular surface and along said outer surface, each of said radial edges intersecting with a corresponding second edge at the marginal surface of said annular surface;

threadably rotating and axially advancing said punch into contact with the pipe-swaging material from said pipe and simultaneously commencing swaging material from a pipe with said radial and second tapping edges, continuing such swaging to advance said radial tapping edges and outer surface tapping edges into the pipe wall by which metal from the metal pipe is caused to flow into the bore of said punch as an opening is formed in said pipe wall;

forming a substantially headless coupon from said flowing metal, as said punch is rotated and axially advanced into said pipe, said coupon being disposed substantially entirely within said bore, and not having a head portion extending outwardly from said bore beyond said annular surface;

reversing rotation of said punch after said radial tapping edges and said outer surface tapping edges have passed through said pipe wall and, withdrawing said coupon from said pipe; and retaining said coupon substantially entirely in said bore and protectively shielding said coupon by the wall of said bore to keep said coupon free of contacting the wall of the opening made in said metal pipe by said tapping portion as said coupon is withdrawn.

* * * * *

PC-1050
(5/69)

UNITED STATES PATENT OFFICE
CERTIFICATE OF CORRECTION

Patent No. 3,617,145      Dated November 2, 1971

Inventor(s) Blase G. Celmer and Michael J. Rafalski

It is certified that error appears in the above-identified patent and that said Letters Patent are hereby corrected as shown below:

Column 1, line 9, "," should be --.--;
          line 28, "ti" should be --it--;
          line 39, "retained within" should be --of--;
          line 61, "interferred" should be "interfered";

Column 3, line 20, "increase" should be --readings--;
          line 37, "sized" should be --sizes--;
          line 47, "tabular" should be --tubular--;

Column 4, lines 44-45, "shu-toff" should be --shut-off--;
          line 69, "point" should be --joint--;

Column 5, line 69, "annular-shaed" should be --annular shaped--;

Column 6, line 25, "meterial" should be --material--;
          line 44, "slightly in" should be --is--;

Column 7, line 59, "taping top" should be --tapping tip--;

Column 8, line 10, "he" should be "the";
          line 20, "swaging" should be --Fig.--;
          line 20, "cross-sectional" should be --of--;
          line 25, "cross!-sectional" should be --cross-sectional--.

Signed and sealed this 2nd day of May 1972.

(SEAL)
Attest:

EDWARD M. FLETCHER, JR.
Attesting Officer

ROBERT GOTTSCHALK
Commissioner of Patents